(12) United States Patent
Krieger

(10) Patent No.: US 9,004,014 B2
(45) Date of Patent: Apr. 14, 2015

(54) TETHERING STAKES

(76) Inventor: John M. Krieger, Cuyahoga Falls, OH (US)

( * ) Notice: Subject to any disclaimer, the term of this patent is extended or adjusted under 35 U.S.C. 154(b) by 748 days.

(21) Appl. No.: 11/807,415

(22) Filed: May 29, 2007

(65) Prior Publication Data

US 2007/0251163 A1 Nov. 1, 2007

Related U.S. Application Data

(62) Division of application No. 10/893,782, filed on Jul. 16, 2004, now Pat. No. 7,225,760.

(51) Int. Cl.
*A01K 1/04* (2006.01)

(52) U.S. Cl.
CPC .......................................... *A01K 1/04* (2013.01)

(58) Field of Classification Search
USPC .................... 244/769, 786, 787, 788; 52/155; 248/499, 530
See application file for complete search history.

(56) References Cited

U.S. PATENT DOCUMENTS

| | | | | |
|---|---|---|---|---|
| 1,169,821 A * | 2/1916 | Hindmarsh | ..................... | 52/153 |
| 2,566,771 A * | 9/1951 | Limpo et al. | ................. | 292/250 |
| 2,706,967 A * | 4/1955 | Iannetti | ........................ | 119/786 |
| 2,771,163 A * | 11/1956 | Mafera, Jr. | ...................... | 52/153 |
| 2,973,595 A * | 3/1961 | Lamphier | ..................... | 160/328 |
| 3,658,037 A * | 4/1972 | Hunter | ......................... | 119/786 |
| 5,040,924 A * | 8/1991 | Kothman | ...................... | 405/244 |
| 5,463,834 A * | 11/1995 | Krieger | .......................... | 52/155 |
| 5,623,843 A * | 4/1997 | Sands | ............................ | 70/234 |
| 2003/0221378 A1* | 12/2003 | Krieger | .......................... | 52/155 |

* cited by examiner

*Primary Examiner* — Valentina Xavier
(74) *Attorney, Agent, or Firm* — Renner, Kenner, Greive, Bobak, Taylor & Weber Co., LPA

(57) ABSTRACT

Tethering stakes of the nature intended to be pounded flush with or below ground level. Certain of the tethering stakes include a cap on the pounding end which is adapted for ease of placement and release of a tethering line. Accordingly, the tethering line can be removed from the stake when it is to be pounded into the ground and then engaged with the stake only when tethering is desired. Certain of the embodiments include caps having uniquely shaped apertures for securing the tethering line. Another includes an aperture in communication with an aperture in the stake such that a lead cable or the like may be moved out of the way when the stake is pounded into the ground and may be fully received within the stake when tethering is not desired. Another embodiment employs a coupler passing through an aperture directly beneath the pounding surface to facilitate ease of attachment and removal of the tethering line.

4 Claims, 4 Drawing Sheets

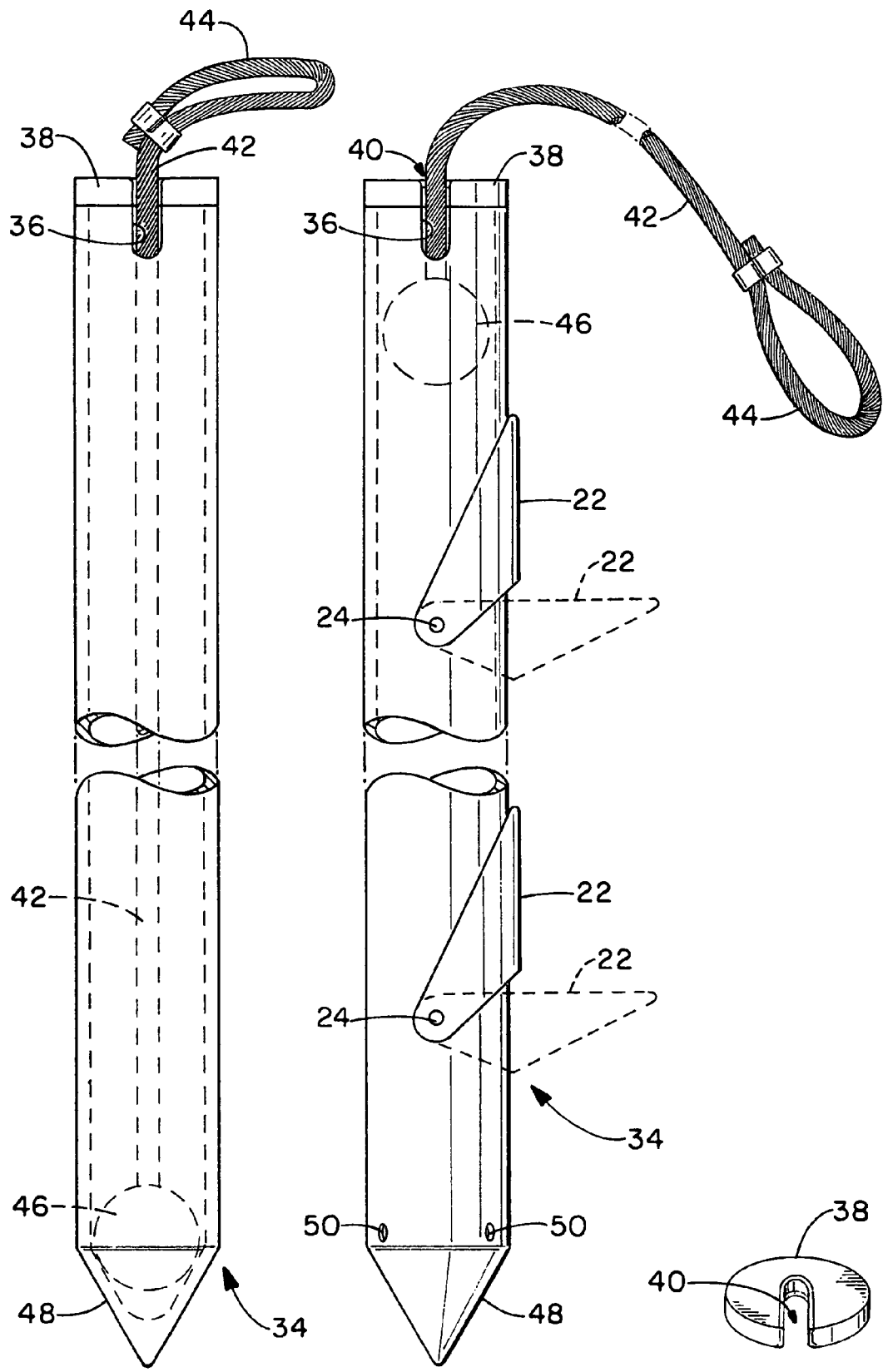

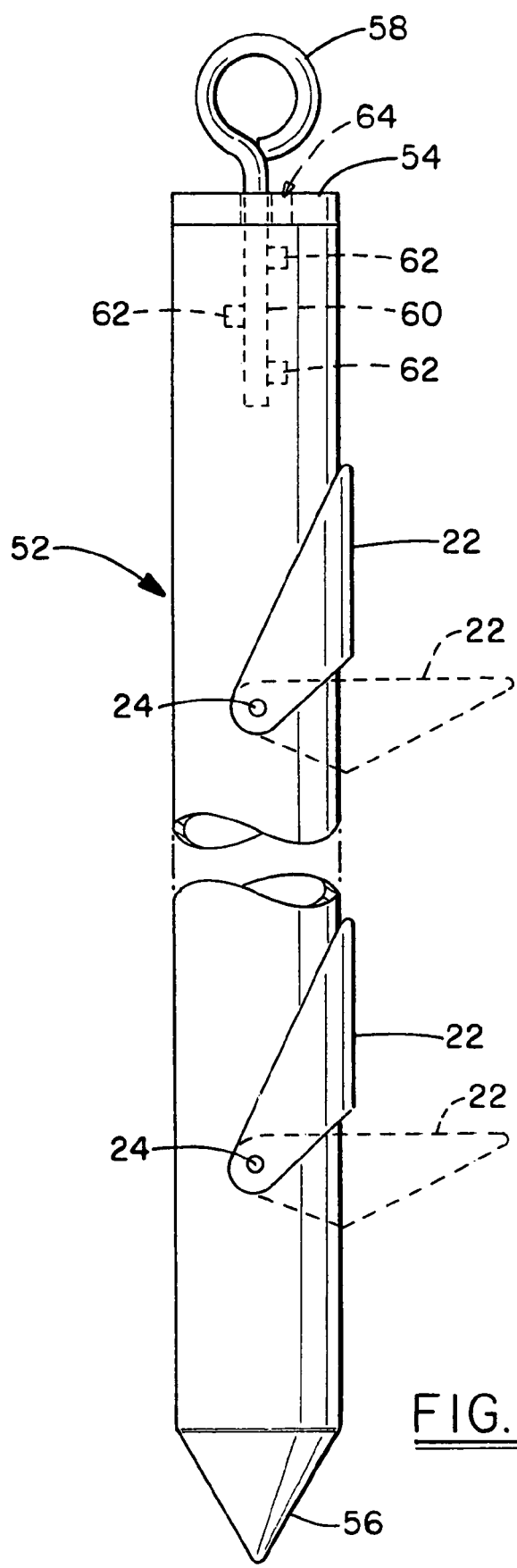
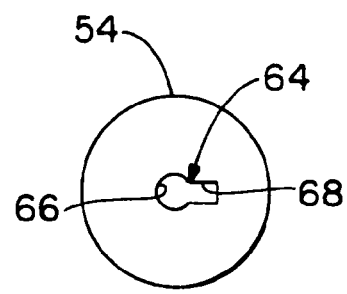
FIG.-10
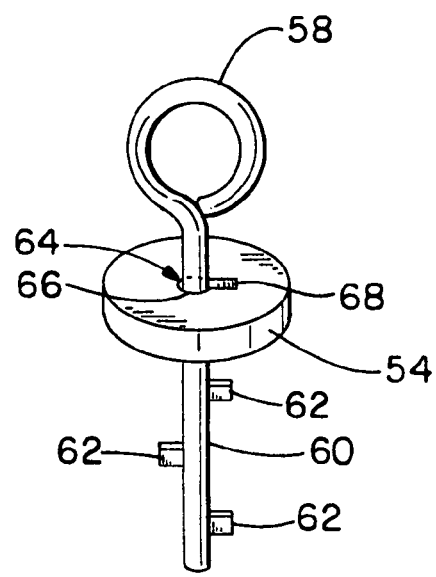
FIG.-11
FIG.-9

TETHERING STAKES

RELATED APPLICATIONS

This application is a divisional of U.S. patent application Ser. No. 10/893,782 filed on Jul. 16, 2004 now U.S. Pat. No. 7,225,760.

TECHNICAL FIELD

The invention herein resides in the art of articles for securing animals or goods to a set location. More particularly, the invention relates to tethering stakes that may be driven into the ground for such purpose. More specifically, the invention relates to tethering stakes having securing lines attached directly to the impact end thereof in such a way as to preclude damage to the securing line when the tethering stake is driven into the ground.

BACKGROUND ART

The desirability of tethering animals or goods to a set location is commonly known. Typically, when an animal is to be tethered, the stake must necessarily be driven into the ground in an otherwise open area such that the animal may move within the area defined by a circle having its center at the tethering stake without becoming entangled with articles within that area. When the tethering stake is driven into the ground in such an open area, it often poses an obstacle to those otherwise desiring to use the area or maintain it. With the tethering stake typically protruding from the ground, the stake poses a hazard for tripping those venturing into the area or engaging mowers or other implements used by those seeking to maintain it. Moreover, with the tethering stake extending from the ground, the security of the engagement is compromised, since the protruding stake defines a lever arm for the animal or would-be intruder to facilitate removal of the stake.

It has been previously known to provide tethering stakes which may be driven completely into the ground and below the ground surface. One such approach is shown in applicant's prior U.S. Pat. No. 5,463,834. While the apparatus of that prior art has been found suitable for its intended purpose, it is not given to complete removal or concealment of the securing line at the point of attachment when tethering is not desired. Further, the claws provided in the prior art tethering stakes, while providing a vast improvement over the art at the time, are of a flat planar nature, somewhat minimizing the effectiveness thereof.

DISCLOSURE OF INVENTION

In light of the foregoing, it is a first aspect of the invention to provide a tethering stake in which the tethering line can be easily removed or otherwise moved from obstruction.

A further aspect of the invention is the provision of a tethering stake in which a securing line, while secured at the impact end of the stake, can be removed, replaced, or positioned such as to be cleared from the impacting activity.

Yet a further aspect of the invention is the provision of a tethering stake in which the secured engagement of the tethering line can be quickly and effectively made.

Still another aspect of the invention is the provision of a tethering stake having securing claws of a cup-shaped nature pivotally attached to the sides thereof.

Yet a further aspect of the invention is the provision of a tethering stake which is durable in construction, simple to use, and easy to construct using state of the art techniques and materials.

The foregoing and other aspects of the invention which will become apparent as the detailed description proceeds are achieved by an article for tethering an object to a set ground location, comprising: an elongated stake having a ground penetrating end and an opposite impact end; and a securing line, said securing line being connected to said impact end and selectively extendable away from said impact end such that said securing line is not impacted when said impact end is struck to drive said article for tethering into the ground.

DESCRIPTION OF THE DRAWINGS

For a complete understanding of the objects, techniques and structure of the invention reference should be made to the following detailed description and accompanying drawings wherein:

FIG. 6 is a front elevational view of a tethering stake according to a second embodiment of the invention;

FIG. 7 is a front elevational view of the embodiment of FIG. 6, showing a tethering line substantially extracted therefrom;

FIG. 8 is a perspective view of the cap employed in the embodiments of FIGS. 6 and 7;

FIG. 9 is a front elevational view of yet another embodiment of a tethering stake made in accordance with the invention;

FIG. 10 is a top plan view of the cap of the tethering stake of FIG. 9;

FIG. 11 is a perspective view of the cap of FIG. 10 receiving a securing pin through the keyhole slot thereof;

BEST MODE FOR CARRYING OUT THE INVENTION

Figure 1:
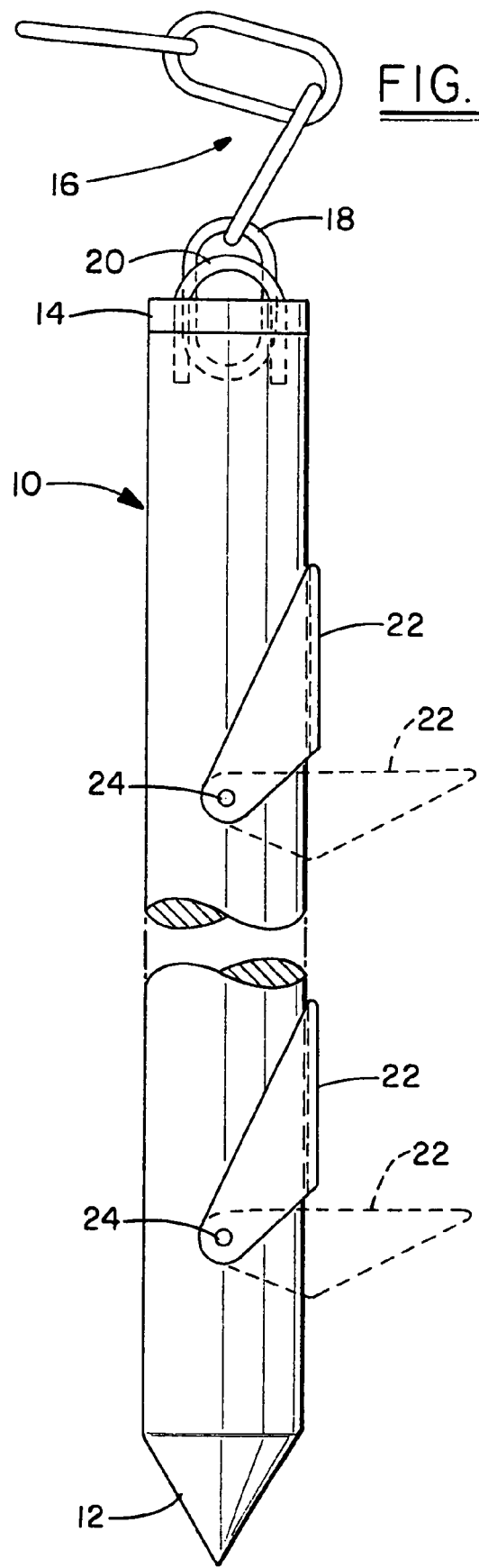
FIG. 1 is a front elevational view of a first tethering stake made in accordance with the invention.

Referring now to the drawings and more particularly to FIG. 1, it can be seen that a first embodiment of the invention comprises a stake 10 which is preferably cylindrical or tubular in nature. Those skilled in the art will, however, appreciate that the stake 10 may be made of angle iron or any other material of any suitable cross sectional geometry. The stake 10 has a pointed or biased cut end portion 12 at one end thereof and a cap 14 at the opposite end. The cap 14, at the impact or driven end of the stake 12, is preferably welded or threaded thereon. A chain 16 is adapted to be secured at the impact end of the stake 12 and is so constrained by a first link 18 thereof being received by the cap 14 and secured thereto by a locking pin or link 20.

Figure 2:
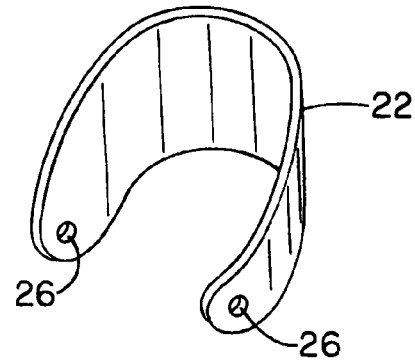
FIG. 2 is a side perspective view of a claw used in association with the stake of FIG. 1.

A pair of claws 22 are pivotally connected by pins 24 passing through the sidewalls of the tubular stake 10. As will be appreciated from reference to FIGS. 1 and 2, the claws 22 are generally wedge shaped cups which may be readily formed by a triangle cut from the side of a cylindrical tube or pipe. The claws 22 are provided with apertures 26 at the ends thereof through which the pivot pins 24 may pass. The claws 22 are adapted for movement between a nesting position against the stake 10 when the same is being driven into the ground, and an extended orthogonal position, shown in phantom in FIG. 1. The extended orthogonal position is obtained when an attempt is made to extract the stake 10 from the ground. The claws 22 engage the ground as the stake is moved upwardly and pivot about the pins 24 into the orthogonal position 22 when the through of the cup between the legs thereof engage the sides of the stake, precluding further rotational movement.

Figure 3:
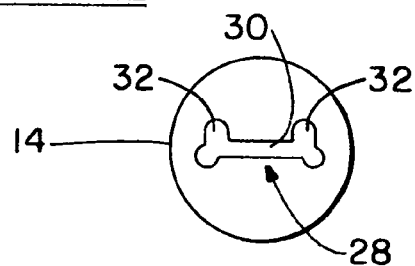
FIG. 3 is a top plan view of the cap employed by the stake of FIG. 1.

As shown in FIG. 3, the cap 14 is characterized by a dog bone shaped aperture 28 passing therethrough. The aperture 28 has a central elongated slot 30 characterized by enlarged lobed heads 32 at each of opposite ends thereof. Each head, as shown in the drawing, has two such lobes.

Figure 4:
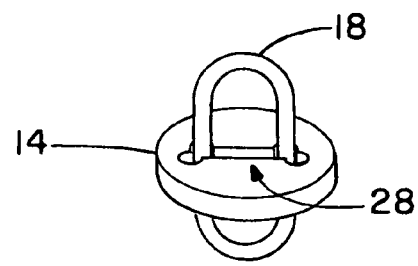
FIG. 4 is a perspective view of the cap of FIG. 3 having a chain link received in the aperture thereof.
Figure 5:
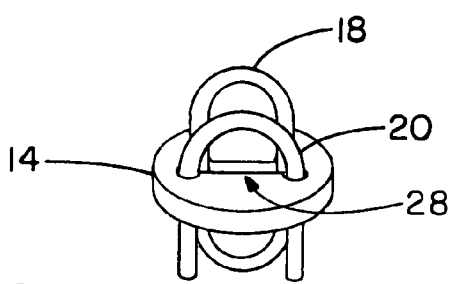
FIG. 5 is a perspective view of the assemblage of FIG. 4 with a securing pin in place to retain the chain link.

As shown in FIGS. 4 and 5, the pair of lobes of each of the heads 32 serves to lock a link 18 of the chain 16 in the end cap 14, while allowing for ease of removal, when desired. As shown in FIG. 4, a link 18 is passed through the slotted opening 30 and then moved such that the intermediate sides of the link are received in one of the lobes of the head 32. When so positioned, a locking pin or link is dropped into the other lobes of the enlarged heads 32, thus precluding movement or extraction of the link 18. It will be readily appreciated that the locking pin or link 20 can simply be a half or end portion of a link 18. The pin 20 prevents the link 18 from moving forwardly into alignment with the centrally elongated slot 30, which is necessary to allow for extraction of the link 18.

It will be readily appreciated that this locking technique allows for ease of driving of the stake 10 without the chain 16 in place, with the subsequent placement of the chain after the stake has been driven flush with or beneath ground level. Once the stake has been so driven, the link 18 is simply placed into the dog bone aperture 28, moved for receipt by one of the pairs of lobes, and then secured therein by the placement of the locking pin or link 20 in the other pair of lobes. The reverse operation is undertaken when it is desired to remove the chain 16, when the tethering is finished.

Referring now to FIGS. 6-8, yet another embodiment of the invention can be appreciated. Here, a stake 34 of preferably cylindrical or tubular nature is employed. The top driven end of the stake 34 has a notched opening 36 extending therefrom. A cap 38 is welded, threaded, or otherwise appropriately secured to the top of the stake 34. As shown in FIG. 8, the cap 38 has a slot 40 extending along a radius thereof. When the cap 38 is secured to the stake 34, it is done so in such a manner as to assure that the notched opening 36 in the side of the stake 34 is in open communication with the slot 40 in the cap 38. However, before the cap 38 is so placed upon the stake 34, the steel cable 42 is placed such that one end thereof is received within the tube 34 and the other end thereof is outside the stake. The steel cable 42 preferably has a loop 44 at one end thereof and ball 46 at the other. The loop 44 is intended for purposes of receiving and securing a chain or other tethering line as may be desired. It will be appreciated that when the stake 34 is to be pounded into the ground, the steel cable 42 is moved into the slot 36 so as not to be impacted during the driving operation. When in use, the steel cable 42 may freely move within the mating slots 36, 40. The ball 46 guarantees that the steel cable 42 cannot be pulled completely loose from the stake 34.

If tethering is not desired, the steel cable 42 may be deposited substantially totally within the interior of stake 34, as best shown in FIG. 6. Accordingly, the loop 44 is out of the way of lawn maintenance implements and does not pose a threat to anyone walking in the lawn.

As further shown in FIGS. 6 and 7, the stake 34 includes a pointed end 38 which may either be cone shaped or effected by a bias cut on the tubular stake 34. If cone shaped, drain holes 50 may be provided to allow slots 36, 40 to weep therefrom. A claw or claws 22 may, of course, be employed in association with the stake 34 as shown in FIG. 7.

It is further preferred, to minimize wear upon the cable 42, that the edges of the slots 36, 40 be radiused or otherwise ground to preclude sharp edges.

Referring now to FIGS. 9-11, an understanding of yet another embodiment of the invention may be obtained. Here, a cylindrical or tubular stake 52 has a cap 54 welded or otherwise attached to the top thereof opposite a pointed end 56. Again, claws 22, of various natures and positions upon the stake 52 may be employed if so desired. An eyelet 58 is connected to a stem 60 having tabs 62 extending therefrom and is removably and securably received by the cap 54.

As best shown in FIGS. 10 and 11, the cap 54 has a keyhole aperture 64 passing centrally therethrough. The keyhole aperture 64 has a circular aperture 66 for receiving the stem 60, and slotted aperture 68 for receiving the tabs 62. It will be appreciated that with the tabs 62 being both circumferentially and longitudinally spaced along the stem 60, placement of the stem 60 into the stake 52 is uniquely achieved by provision of the keyhole opening 64 in the cap 54. First, the end of the stem 60 is placed into the circular aperture 64 and then the stem 60 is rotated until the first tab 62 aligns with the slot 68. With the first tab 62 having passed through the slot 68, the stem 60 is rotated until the next tab 62 aligns with the slot 68 and is passed therethrough. The sequence continues until the eyelet 58 rests atop the cap 54. It should then be appreciated that removal of the eyelet and stem 60 would proceed in the reverse sequence. However, the likelihood of any such extraction occurring unintentionally or by a tethered animal is extremely remote.

In operation, the stake 52 is driven into the ground by impacting the cap 54 with the eyelet and stem assembly 58, 60 having been removed therefrom. With the stake positioned with the cap 54 flush or slightly below the ground level, the eyelet and stem assembly 58, 60 is placed in engagement as previously discussed and a tethering line or the like can then be secured to the eyelet 58 for desired use.

Figure 12:
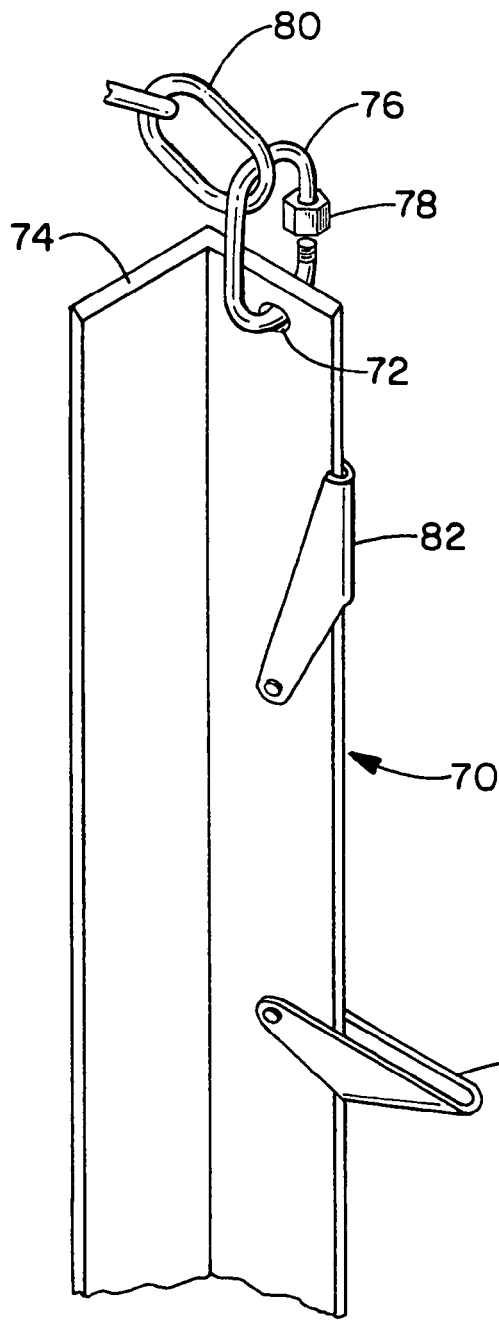
FIG. 12 is a perspective view of yet another embodiment of the invention wherein an angle iron stake is used.
Figure 13:
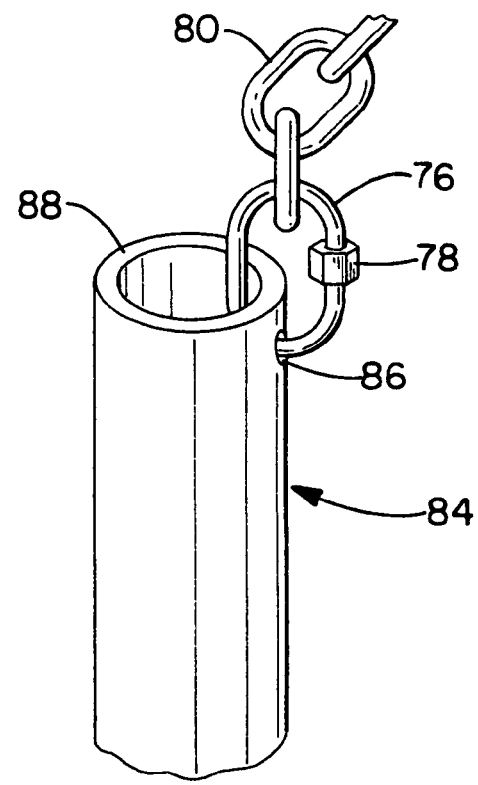
FIG. 13 is an embodiment corresponding to that of FIG. 12 wherein a tubular stake is employed.
Figure 14:
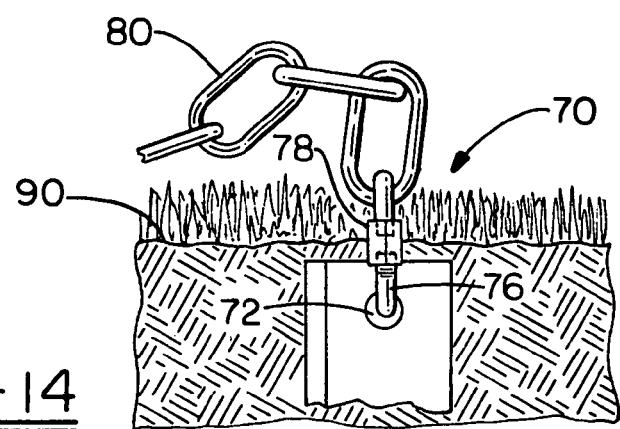
FIG. 14 is an illustrative view of the stake of FIG. 12 received within the ground.

Referring now to FIGS. 12-14, additional embodiments of yet a further concept of the invention may be seen. As shown in FIG. 12, a stake 70 of angle iron or the like is provided with an aperture 72 at the impact end 74. A connector 76, having a threaded union nut 78 thereon is passed through the aperture 72 and into engagement with the first link of a tether chain 80 after the stake 70 has been pounded into the ground, as shown in FIG. 14. Of course, the connector 76 may be used to secure tethering lines other than the chain 80. In any event, the connector 76 may either be rotated away from the impact head 74 during placement of the stake 70, or may be totally removed during that period of time and then placed after the stake 70 has been pounded into its final position.

As shown, pivotally connected barbs or claws, of a planar nature, may be used, if desired. Of course, the cup-shape claws 22 might also be employed, if desired, with the legs of the claws spanning one of the legs of the angle iron and being appropriately pinned thereto by a pivot pin. Two barbs or claws 82 are shown in FIG. 12. The upper barb 82 is shown in the position assumed thereby when the stake 70 is being pounded into the ground. The lower barb 82 is shown in the extended or substantially orthogonal position when an attempt is made to pull the stake 70 from the ground. Obviously, both of the barbs 82 would assume the same position at any particular point in time. In other words, both would be aligned with the stake 70 when it is being driven, and both would be orthogonal to the stake 70 when it is being extracted. Such is true of both the planar and cup-shaped claws. It will further be appreciated that the cup-shaped claws provides enhanced resistance to extraction over the more planar claw.

As shown in FIG. 13, the concept of FIG. 12 may be expanded to a tubular or cylindrical stake 84. Again, an aperture 86 is positioned beneath the pounding or impact head 88 such as that the connector 76 may be removed prior to the pounding operation and then placed therein after the pounding head 88 has been positioned beneath the ground level 90, as shown with respect to the stake 70 in FIG. 14.

Thus it can be seen that the objects of the invention have been satisfied by the structure presented above. While in accordance with the patent statutes only the best mode and preferred embodiments of the invention have been presented and described in detail, the invention is not limited thereto or thereby. Accordingly, for an appreciation of the true scope and breadth of the invention, reference should be made to the following claims.

What is claimed:

1. An article for tethering an object to a set ground location, comprising:
    an elongated stake providing a planar extension having opposed sides defining the width and length of said planar extension and joined by an edge that defines the thickness of said planar extension, said planar extension having a ground penetrating end and an opposite impact end;
    an aperture in said planar extension proximate said impact end;
    a securing line, said securing line being connected to said planar extension by a connector, said connector being in the form of a loop extending through said aperture in said planar extension, with said loop sized such that said connector can be pivoted between a position above said impact end and a position below said impact end and, in said position below said impact end said connector is not impacted when said impact end is struck to drive said impact end into the ground, and driving said impact end into the ground causes said loop to extend above said impact end; and
    a claw pivotally connected to said stake, such that said claw pivots upwardly and nests parallel with the side of the stake when the stake is driven into the ground, and said claw pivots downwardly and extends outwardly from said stake as the stake is removed from a position wherein it has been driven into the ground, such that said claw resists removal of said stake from the ground.

2. The article for tethering as recited in claim 1, wherein said claw includes opposed legs connected by an extension, said opposed legs pivotally connecting said claw to said stake such that said extension nests parallel with the side of the stake when the stake is driven into the ground, said claw being a substantially triangular member, with said opposed legs being in the shape of a triangle and connected by said extension along one side of said triangle.

3. The article for tethering as recited in claim 1, wherein said planar extension is longer in width and length than in thickness.

4. The article for tethering as recited in claim 2, wherein one of said opposed legs of said claw is secured to one of said opposed sides of said planar extension, while the other of said opposed legs of said claw is secured to the other one of said opposed sides of said planar extension, with the pivoting of said claw upwardly and downwardly being limited by contact between said extension of the claw and the edge of the planar extension.

* * * * *